March 1, 1949.　　C. E. STEPHENS　　2,463,212
LOADING TRAILER
Filed Aug. 8, 1947　　2 Sheets-Sheet 1
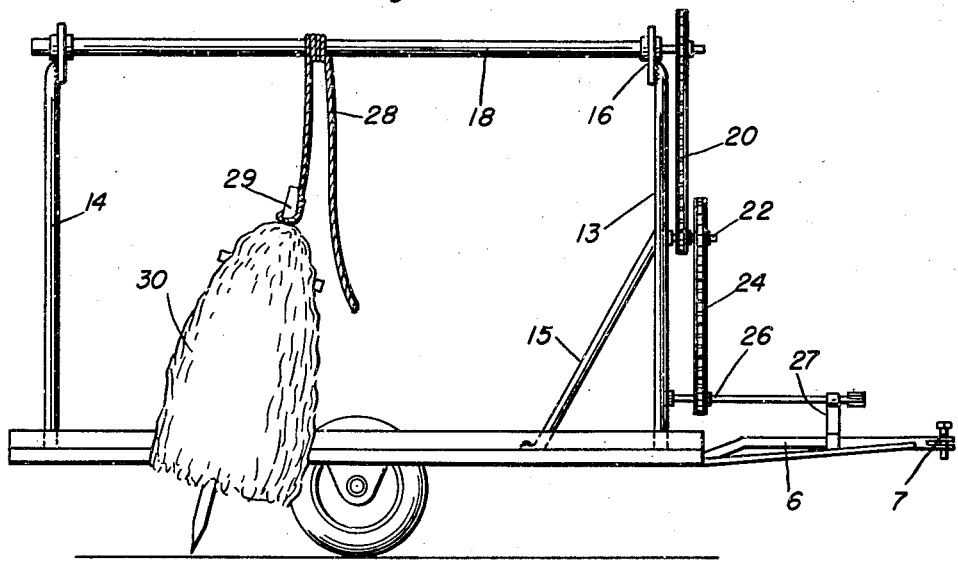
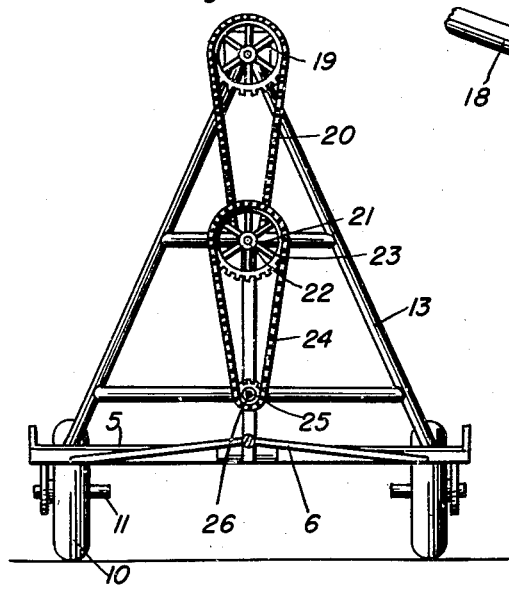
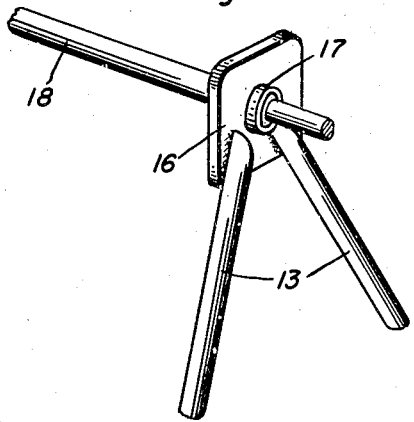
Inventor
Cecil E. Stephens March 1, 1949. C. E. STEPHENS 2,463,212
LOADING TRAILER
Filed Aug. 8, 1947 2 Sheets-Sheet 2

Inventor
Cecil E. Stephens
By Clarence A. O'Brien
and Harvey B. Jacobson
Attorneys Patented Mar. 1, 1949

2,463,212

UNITED STATES PATENT OFFICE 2,463,212

LOADING TRAILER

Cecil E. Stephens, Eufaula, Ala.

Application August 8, 1947, Serial No. 767,369

1 Claim. (Cl. 214—75)

The present invention relates to new and useful improvements in trailers and more particularly to a peanut stack loading trailer.

In the harvesting of peanuts the plants are stacked above a stake driven in the ground and the stacks of peanuts are then hauled from the field. Each stack of peanuts weighs several hundred pounds and it is difficult to remove the stake from the ground with the stack of peanuts thereon.

Accordingly it is an object of the present invention to provide a trailer including hoisting means operated by the power take-off of a tractor for pulling the stake with the stack of peanuts thereon from the ground and loading the same onto the trailer without the use of manual effort.

A further object of the invention is to provide a loading trailer of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a front elevational view;

Figure 5 is an enlarged fragmentary perspective view of the support for one end of the hoisting windlass.

Figure 3:
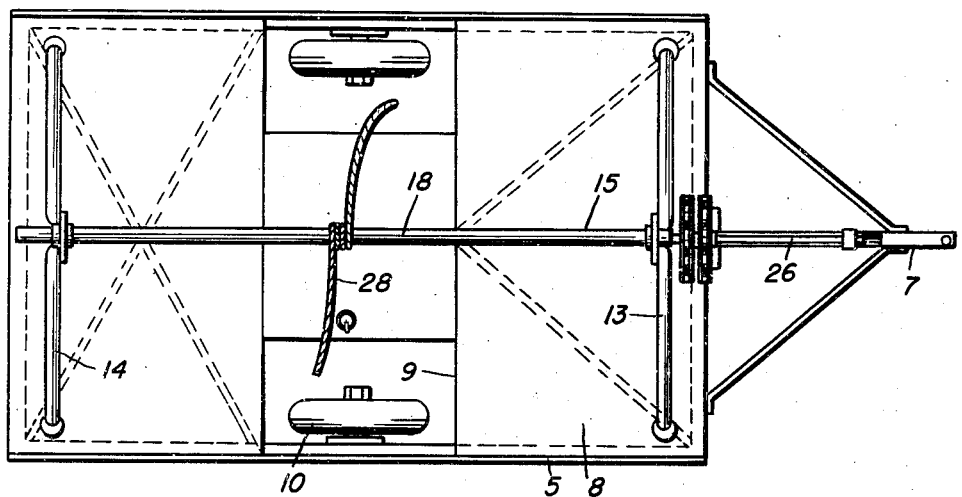
Figure 3 is a top plan view.
Figure 4:
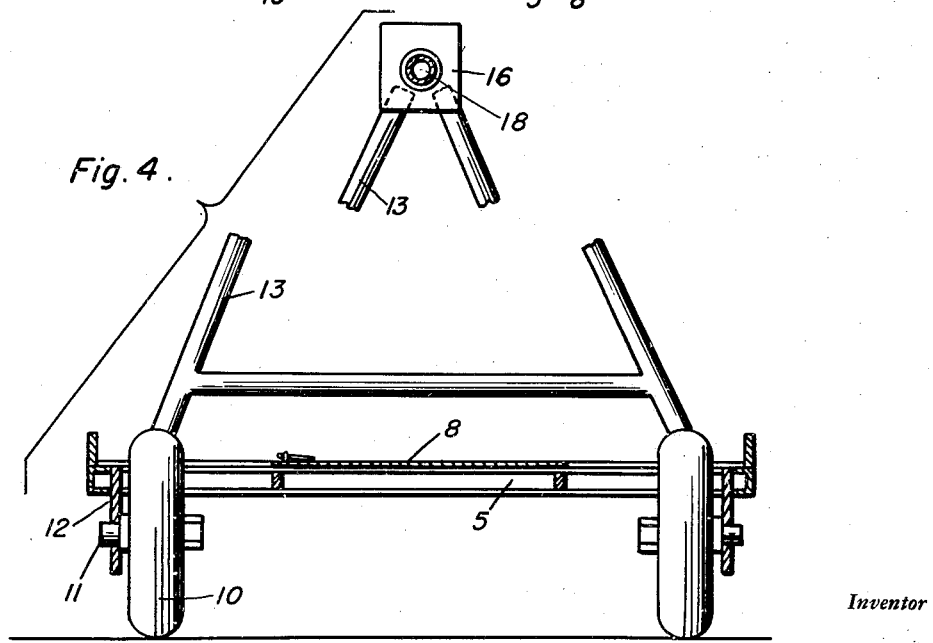
Figure 4 is a transverse sectional view taken on the line 4—4 of Figure 3.

Referring now to the drawings in detail wherein for the purpose of illustration I have disclosed a preferred embodiment of the invention the numeral 5 designates the trailer frame having a tongue 6 projecting forwardly from one end and provided with a coupling pin 7 for attaching to a tractor or other power operated vehicle having a power take-off.

A platform or body 8 is supported on the frame 5 in which openings 9 are provided at its central side portions to accommodate a pair of wheels 10 which are journaled on stub axles 11 supported by hangers 12 extending downwardly from the sides of the frame.

Front and rear A frames 13 and 14 are supported in an upright position at the front and rear ends of the frame 5, the front frame 13 being provided with a rearwardly inclined brace 15.

Bearing plates 16 are suitably secured in an upright position to the upper ends of the frames 13 and 14, each plate having a bearing 17 therein for rotatably supporting the ends of the longitudinally extending shaft or windlass 18.

A sprocket 19 is secured to the front end of the windlass 18 which is driven by a chain 20 from a reduced sprocket 21 journaled at the central portion of the front frame 13. The sprocket 21 is secured to a short shaft 22 to which is also secured a sprocket 23 of increased ratio and is driven by a lower chain 24 from a sprocket 25 of reduced ratio and which is secured to a lower shaft 26 journaled in bearing bracket 27 and which extends forwardly above the tongue 6 for attaching to a conventional power take-off of a tractor.

In the operation of the device with the shaft 26 operatively attached to the power take-off of a tractor a rope or cable 28 is coiled several times around the windlass 18 as shown in Figure 1 of the drawings with one end of the rope held by a person standing on the platform 8 and the other end of the rope attached to the upper end of a stake 29 on which peanut plants 30 are stacked. The rotation of the windlass 18 will accordingly serve to wind a rope 28 thereon and to pull the stake 29 from the ground and to raise the stack of peanuts into a position for loading onto the platform 8.

After the trailer has been loaded the stacks of peanuts may then be hauled from the field.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a motor vehicle having a power take-off; a loading trailer comprising an open flat wheeled body, pairs of upwardly and inwardly inclined rods carried by said body forming inverted front and rear V-frames, upper and lower braces secured to said front frame, a longitudinally extending windlass rotatably supported at the apices of said frames, a first sprocket carried at one end of said shaft, a further shaft rotatably supported on the lower brace, means for drivingly connecting said further shaft to the power take-off, a second sprocket on said further shaft, a third shaft rotatably supported on said upper brace, a third and fourth sprocket carried on said third shaft, endless chains interconnecting said first and third sprocket and said second and fourth sprockets, and a hoisting cable operated by the windlass.

CECIL E. STEPHENS.

REFERENCES CITED

The following references are of record in the file of this patent:

UNITED STATES PATENTS

| Number | Name | Date |
| --- | --- | --- |
| 261,308 | Clark | July 18, 1882 |
| 542,814 | Stout | July 16, 1895 |
| 943,473 | Schuman | Dec. 14, 1909 |
| 2,161,734 | Wheless | June 6, 1939 |
| 2,190,061 | Fisher et al. | Feb. 13, 1940 |

FOREIGN PATENTS

| Number | Country | Date |
| --- | --- | --- |
| 318,330 | Great Britain | Sept. 5, 1929 |